United States Patent [19]

Gagnon et al.

[11] Patent Number: 4,500,172
[45] Date of Patent: Feb. 19, 1985

[54] TWO COLOR LIQUID CRYSTAL LIGHT VALVE IMAGE PROJECTION SYSTEM WITH SINGLE PREPOLARIZER

[75] Inventors: Ralph J. Gagnon, Chico; Roy A. Cedarstrom, Fullerton, both of Calif.

[73] Assignee: Hughes Aircraft Company, El Segundo, Calif.

[21] Appl. No.: 334,679

[22] Filed: Dec. 28, 1981

[51] Int. Cl.³ .................. G02F 1/13; G03B 21/00; G02B 5/30
[52] U.S. Cl. .................. 350/331 R; 350/345; 350/337; 350/408; 353/31
[58] Field of Search ............ 350/331 R, 342, 345, 350/401, 403, 408; 353/31, 34, 37

[56] References Cited

U.S. PATENT DOCUMENTS

| | | | |
|---|---|---|---|
| 2,403,731 | 7/1946 | MacNeille et al. | 350/395 X |
| 4,019,807 | 4/1977 | Boswell et al. | 350/342 |
| 4,191,656 | 3/1980 | Hong et al. | 350/342 X |
| 4,345,258 | 8/1982 | Tsai et al. | 350/31 X |

OTHER PUBLICATIONS

Hong et al., II, "Application of the Liquid Crystal Light Valve to a Large Screen Graphics Display", SID, May 8, 1979.

*Primary Examiner*—John K. Corbin
*Assistant Examiner*—David Lewis
*Attorney, Agent, or Firm*—W. J. Benman, Jr.; A. W. Karambelas

[57] ABSTRACT

An optical arrangement is disclosed which provides color selective prepolarization of the light incident upon two or more light valves. This is accomplished by the use of a prepolarizing prism which acts on light from a light source to direct light of a first polarization to a first dichroic separator and light of a second polarization to a second dichroic separator. Each separator transmits an output beam having substantially a single color and a single polarization state. The two resulting beams are recombined by a dichroic adder prior to being applied to a second polarizing prism. The second polarizing prism directs light of a first color and polarization to a first light valve and light a second color and polarization to a second light valve. The result is that one light valve sees light of a first color and a first polarization and the other light valve sees light of a second color and second polarization. Each light valve modulates the polarization state of incident light in accordance with the input or writing light. Where the writing light is present, the polarization state is changed from the first to the second or vice versa depending upon the light valve. The output of each light valve is applied to a second or main polarizing prism which converts the modulations of polarization into modulations of brightness. The output of the main polarizing prism is then applied to a projection lens in a conventional manner.

5 Claims, 1 Drawing Figure

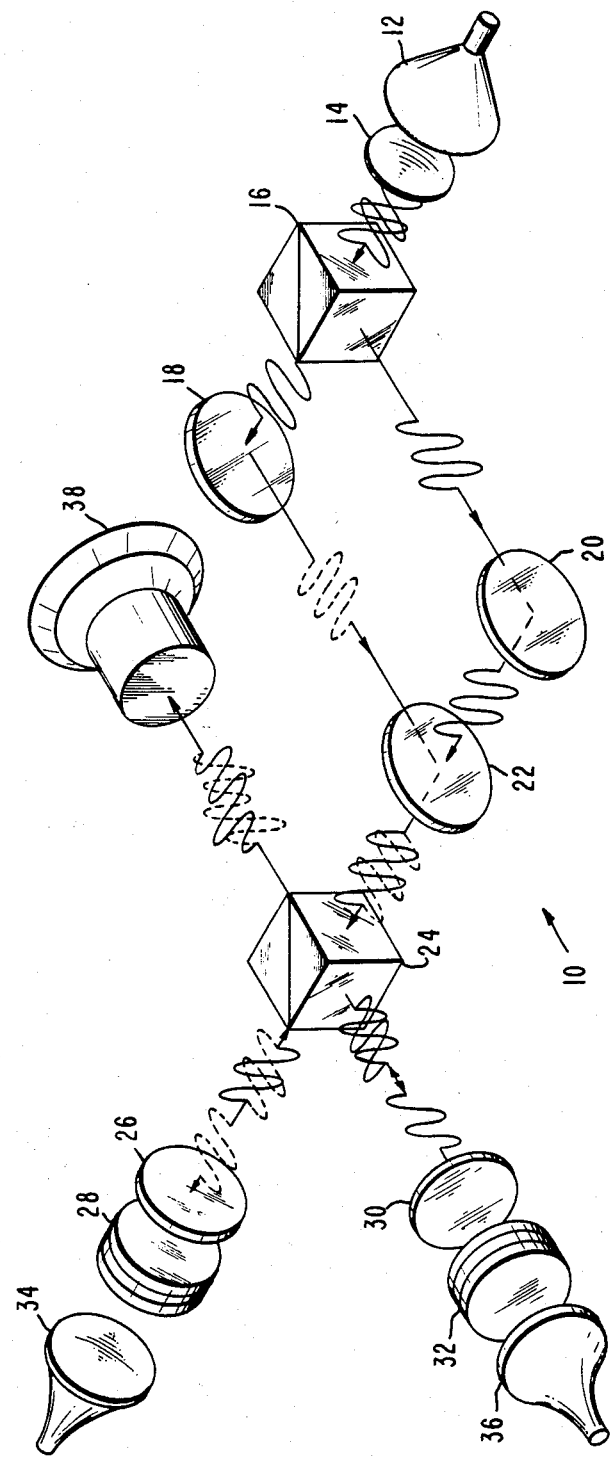

TWO COLOR LIQUID CRYSTAL LIGHT VALVE IMAGE PROJECTION SYSTEM WITH SINGLE PREPOLARIZER

BACKGROUND OF THE INVENTION

1. Field of the Invention

This invention relates to liquid crystal light valve projectors. Specifically, this invention relates to prepolarizing prisms used with two color projection systems.

While the present invention will be described herein with reference to particular applications, it is to be understood that the invention is not limited thereto. Those having ordinary skill in the art and access to the teachings of this invention will recognize additional applications within the scope thereof.

2. Description of the Prior Art

The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube, is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirror is polarization-modulated in accordance with the information incident on the photoconductor. Therefore, if a complex distribution of light, for example a high resolution input image, is focused onto the photoconductor surface, the device converts the image into a replica which can be projected with magnification to produce a high brightness image on a viewing screen. U.S. Pat. No. 4,019,807 issued to D. D. Boswell et al on Apr. 26, 1977 discloses such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 Society for Information Display (SID), International Symposium, Digest of Technical Papers, May 1979, pp. 22-33. This display system, a type with which the present invention is particularly but not exclusively concerned, projects a large scale image having a yellow-white characters on a dark blue background. The system includes a cathode ray tube (CRT) which provides input imagery; projection optics which provide the bright collimated output beam and necessary light polarization; and the liquid crystal light valve which interfaces the input and output functions.

The system uses a powerful light source such as a xenon arc lamp to illuminate the liquid crystal light valve through collimating and polarizing optics. Light emitted from the xenon arc lamp is transmitted to a main polarizing prism where it is separated into 'S' and 'P' components. The 'P' component passes through the prism while the 'S' component is reflected toward the light valve. Information displayed by cathode ray tube is transferred by fiber optics to one side of the light valve which changes the polarization state from 'S' to 'P'. The light is then transmitted through the prism and imaged on a screen by a projection lens. In this capacity, the main prism functions as an analyzer, converting modulations of polarization to modulations of brightness or intensity.

The quality of the projected image is generally a function of brightness, resolution and contrast. Image quality can generally be improved by placing a prepolarizing prism in the optical path in front of the main polarizing prism. The prepolarizing prism is somewhat effective in overcoming the deficiencies in the main polarizing prism. That is, since the main polarizing prism is not 100% effective in transmitting light of one polarization and reflecting light of another, light of an undesirable polarization may reach the light valve and be modulated and reflected back through the main prism onto the projection lens. This often results in distortions of color and/or reductions in contrast and resolution.

Since the prepolarizing prism may, for reasons of cost, be of the same design as the main prism, it would typically have similar reflectance and transmittance characteristics. However, when the two prisms are used in combination, the additive effect is such as to greatly improve the quality of the projected image. The prepolarizing prism substantially removes light of one polarization from the light which illuminates the main prism. The main prism then acts on the beam to substantially remove the residual light of the undesirable polarization.

However, in some applications it is desirable to use a second liquid crystal light valve for enhanced information displaying capability and versatility. In this application, the use of the prepolarizing prism becomes problematic insofar as the second light valve would require light of the polarization that would otherwise be removed by the prepolarizing prism. As a result, the use of a second light valve has forced a compromise in the quality of the projected image. This problem is addressed by one of the coinventors in a copending application entitled, "Two Color Liquid Crystal Light Valve Image Projection System With Color Selective Prepolarizors". It discloses the use of two prepolarizing prisms. As such, there remains a need for a less costly, less complicated solution to the above-noted problems.

SUMMARY OF THE INVENTION

The present invention addresses the shortcomings of the prior art by providing color selective prepolarization of the light incident upon two or more light valves through the use of a single prepolarizing prism. The prepolarizing prism acts on light from a light source to direct light of a first polarization to a first dichroic separator and light of a second polarization to a second dichroic separator. The two resulting beams are recombined in dichroic adder prior to being applied to a second polarizing prism. The second polarizing prism directs light of a first color and polarization to a first light and light of a second color and polarization to a second light valve. The result is that one light valve sees light of a first color and a first polarization and the second light valve sees light of a second color and second polarization. Each light valve modulates the polarization state of incident light in accordance with the input or writing light. Where the writing light is present, the polarization state is changed from the first to the second or vice versa depending upon the light valve. The output of each light valve is applied to the second polarizing prism which converts the modulations of polarization into modulations of brightness. The output of the second polarizing prism is then applied to the projection lens in a conventional manner.

BRIEF DESCRIPTION OF THE DRAWING

The FIGURE is a diagrammatic representation of a preferred embodiment of the present invention.

DETAILED DESCRIPTION OF THE INVENTION

The preferred embodiment of the two color liquid crystal light valve image projection system of the present invention is shown in full perspective in the FIGURE. The system 10 includes a xenon arc lamp 12 as a light source. A collimating lens 14 is mounted in coaxial alignment with the lamp 12. The xenon arc lamp 12 and the collimating lens 14 cooperate to provide a high intensity beam of unpolarized collimated light energy containing the entire visible spectrum or white light. Other sources of light energy can be utilized here without departing from the scope of the present invention.

A prepolarizing beam splitter 16 is aligned with the lamp 12 and the collimating lens 14. The prepolarizing beam splitter 16 is preferably a polarization selective light dividing interference coating or a multi-refractive layer device of the type described in U.S. Pat. No. 2,403,731 to MacNeille. As disclosed in this patent, a plurality of refractive layers of thin film coating of appropriate index of refraction and thickness are deposited at the interface between two halves of a glass cube so that the layer forms a 45° angle with the intersecting sides of the cube. The thin film coating is effective to transmit light of substantially a first polarization, here P, and reflect light of substantially a second polarization, here S. Accordingly, prepolarizing beam splitter 16 substantially passes the P component in one direction while reflecting the S component in another. This results in two substantially polarized beams. The P polarized beam is represented in the FIGURE as a horizontally oriented wave. The S polarized beam is represented as a vertically oriented wave.

In the preferred embodiment, the P polarized beam is transmitted to a first dichroic separator 18. The S polarized beam is transmitted to a second dichroic separator 20. The dichroic separators 18 and 20 and dichroic adder 22 do not effect the polarization states of the light beams. The separators 18 and 20 have wavelength selective coatings which are effective to reflect light of one color while transmitting light of another. The separators 18 and 20 and the adder 22 are produced by a number of vendors including Optical Coating Laboratories Incorporated.

The first dichroic separator 18 receives P polarized white light and reflects P polarized green light. In effect, it extracts the green light from the incident white light. The green P polarized output beam is shown in the FIGURE as a dashed horizontal wave. A second dichroic separator 20 receives the reflection of the S polarized beam from the prepolarizer 16. The dichroic separator 20 extracts red light from incident white light and reflects it to dichroic adder 22. The dichroic adder 22 combines the beams from the seperators 18 and 20 to provide an output beam which consist of green light which is P polarized and red light which is S polarized.

The combined beam illuminates the main prism 24 which is also a polarizing beam splitter of the above described MacNeille bi-prism variety. In the preferred embodiment, the main prism 24 is of an optimal design which is indentical to that of the prepolarizing beam splitter 16. The main prism transmits the green P polarized light through a trim filter 26 to a first light valve 28. The main prism 24 also reflects the red S polarized light through a trim filter 30 to a second light valve 32. Since the main prism is also a polarizer it operates on the incident P polarized light to substantially remove any residue of S polarized light which was not removed by the prepolarizing prism 16. The same is true for the S polarized light incident on the main prim 24. The net result is a significant improvement in contrast without the sacrifice of the second color channel through the use of a single prepolarizing beamsplitter.

The trim filters 26 and 30 are designed to prevent light of the wrong color from reaching the light valve. As described in U.S. Pat. No. 4,019,807, the light valves 28 and 32 modulate the polarization of incident light in accordance with the presence of writing light from a modulating source such as cathode ray tubes 34, and 36 respectively.

The light altered by light valves 28 and 32 is returned to the main prism 24 where modulations of a polarization are converted to modulations of brightness. The main prism 24 combines the modulated light from the light valves 28 and 32 and transmits it to the projection lens 38 for projection on a screen or surface (not shown) in the conventional manner. It should be noted that the beamsplitters were designed and evaluated with the aid of the thin film computer program provide as a service by the Genesee Company of Rochester N.Y.

The present invention has been described with reference to a particular embodiment and the context of a particular application. It is understood that those having ordinary skill in the art will be able to modify the present invention within the scope of the teachings thereof. It is contemplated that any such systems will be within the scope of the following claims.

What is claimed is:

1. A two-color image projection system with prepolarization comprising:
    a light source for providing light energy;
    a prepolarizing beamsplitter for splitting and prepolarizing the light from the source into first and second beams having first and second polarization states respectively;
    a first dichroic separator for extracting light of a first color from said first beam;
    a second dichroic separator for extracting light of a second color from said second beam;
    a dichroic adder for combining the first and second beams into a single beam;
    a polarizer for splitting the single beam and reflecting light of the first color and polarization and transmitting light of the second color and polarization;
    a first liquid crystal light valve for selectively modulating the polarization state of the light reflected by said polarizer from the first polarization state to the second polarization state;
    a second liquid crystal light valve for selectively modulating the polarization state of the light transmitted by said polarizer from the second polarization state to the first polarization state; and
    means for projecting light modulated by said first and second light valves.

2. The two-color image projection system of claim 1 wherein said prepolarizing beamsplitter is a bi-prism type polarizing beamsplitter.

3. A color selective prepolarizing system for liquid crystal light valve projectors comprising:
- a prepolarizing beamsplitter for splitting and prepolarizing light from a source into first and second beams having first and second polarization states respectively;
- first means for extracting light of a first color from said first beam;
- second means for extracting light of a second color from said second beam; and
- means for combining the first and second beams into a single beam having substantially two components, the first component having essentially light of a first color and first polarization state and the second component having essentially light of a second color and a second polarization state.

4. The color selective prepolarizing system of claim 3 wherein said first and second means includes dichroic separators.

5. The color selective prepolarizing system of claim 4 wherein said means for combining the first and second beams into a single beam includes a dichroic adder.

* * * * *